F. A. KIMBLE AND W. S. FOX.
TRACTION ATTACHMENT FOR VEHICLE WHEELS.
APPLICATION FILED DEC. 19, 1919.
1,366,810.
Patented Jan. 25, 1921.
2 SHEETS—SHEET 1.
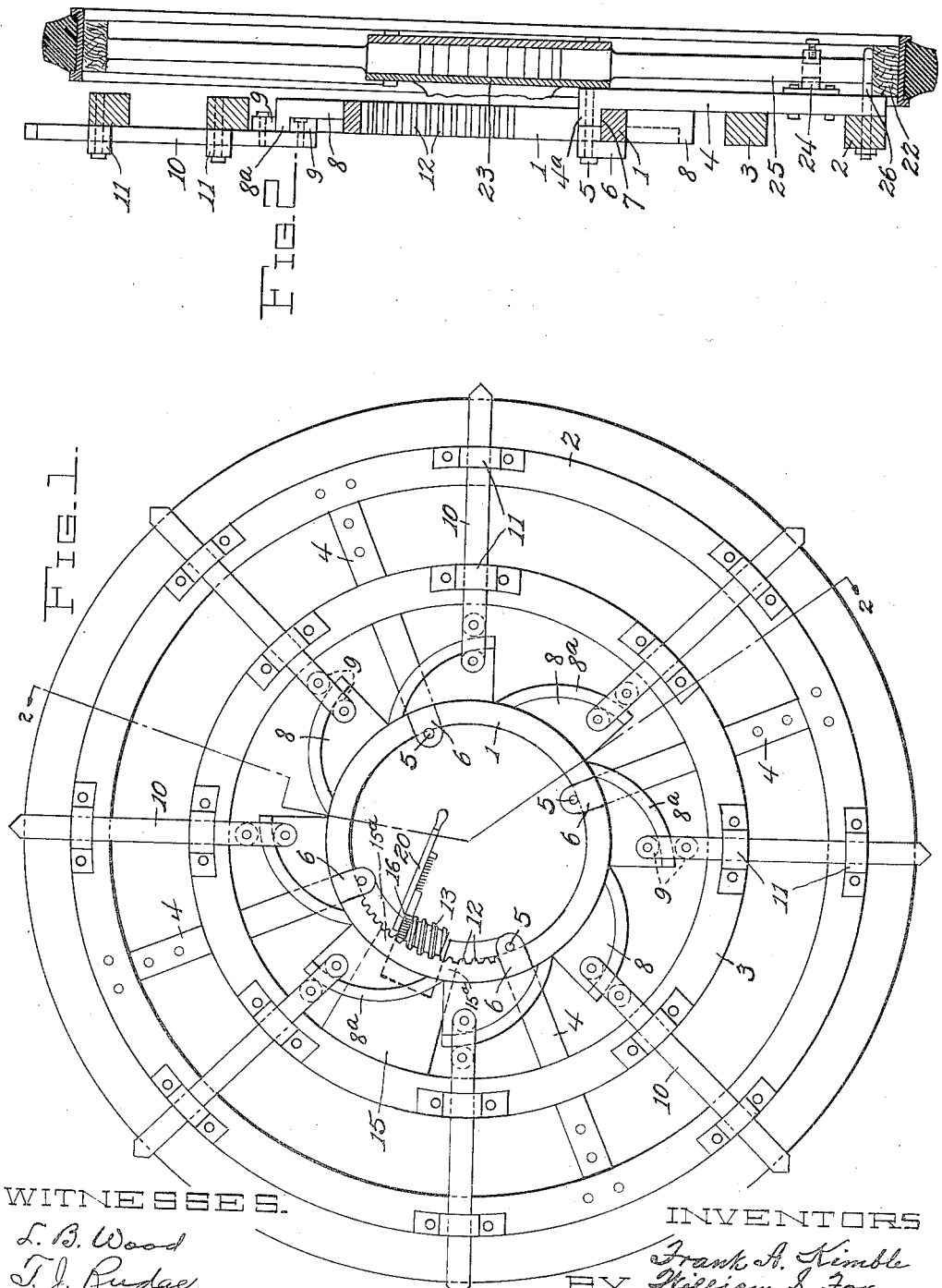

F. A. KIMBLE AND W. S. FOX.
TRACTION ATTACHMENT FOR VEHICLE WHEELS.
APPLICATION FILED DEC. 19, 1919.
1,366,810.
Patented Jan. 25, 1921.
2 SHEETS—SHEET 2.
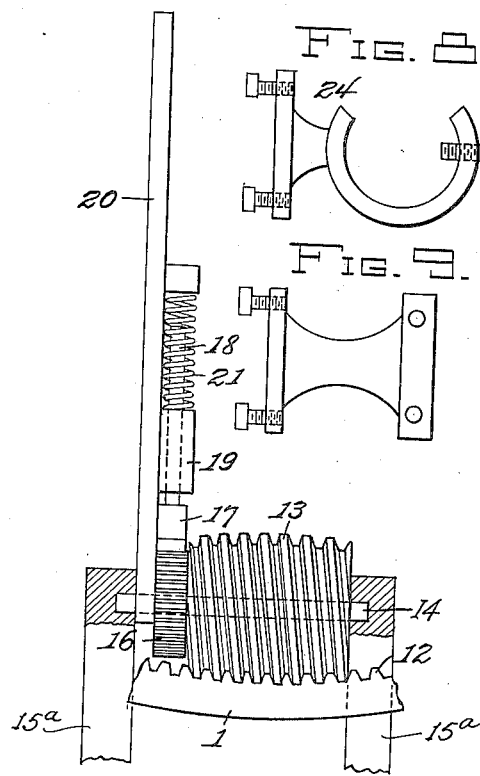
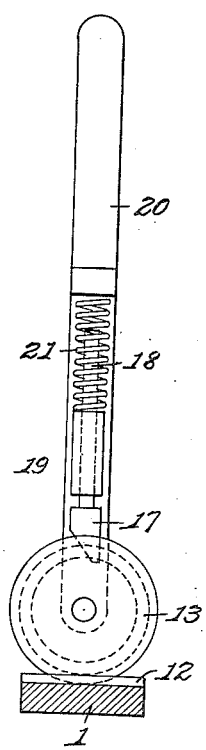
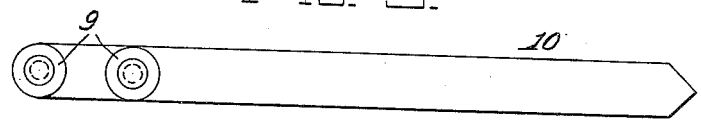
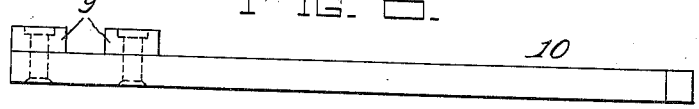
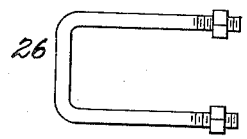
WITNESSES
L. B. Wood
T. J. Rudge
INVENTORS
Frank A. Kimble
William S. Fox
BY H. E. Dunlap
ATTORNEY

UNITED STATES PATENT OFFICE.

FRANK A. KIMBLE AND WILLIAM S. FOX, OF ZANESVILLE, OHIO.

TRACTION ATTACHMENT FOR VEHICLE-WHEELS.

1,366,810.

Specification of Letters Patent.  Patented Jan. 25, 1921.

Application filed December 19, 1919. Serial No. 345,992.

*To all whom it may concern:*

Be it known that we, FRANK A. KIMBLE and WILLIAM S. FOX, citizens of the United States of America, and residents of Zanesville, county of Muskingum, and State of Ohio, have invented certain new and useful Improvements in Traction Attachments for Vehicle-Wheels, of which the following is a specification.

This invention relates broadly to traction devices for vehicle wheels, and it has for its primary object to provide an attachment for wheels embodying road-engaging spikes and means whereby said spikes may be adjusted to any required extent for affording traction to the wheel.

A further object is to provide an attachment for vehicle wheels which may, if desired, remain permanently attached to the wheel and, when the use of auxiliary traction means is not required, may have its spikes withdrawn to a position in which they do not engage the roadway.

With these and other objects in view, the invention resides in the features of construction, arrangement of parts and combinations of elements which will hereinafter be fully described, reference being had to the accompanying drawings, in which—

Figure 1 is a side elevation of the invention;

Fig. 2 is a section of the same, applied, said section being taken substantially on the line 2—2, Fig. 1;

Fig. 3 is an enlarged plan view of the worm and the ratchet mechanism by which said worm is rotated;

Fig. 4 is a side view of the same;

Fig. 5 is an enlarged inner face view of a spike;

Fig. 6 is an edge view of the same;

Fig. 7 is an enlarged view of a U-shaped clamp;

Fig. 8 is an enlarged plan view of a clamp for attachment to wheel spokes of round form; and—

Fig. 9 is a similar view of a clamp modified in form to adapt it for application to spokes of approximately flat-sided form.

Referring to said drawings, in which like designating characters distinguish like parts throughout the several views—

1 and 2 indicate, respectively, the inner and outer of two concentric rings, and 3 a third ring located intermediate said rings 1 and 2. The rings 2 and 3 are disposed in fixed relation, both being rigidly attached to radially disposed bars 4 which are located inwardly, or rearwardly, with respect to said rings and which are prolonged inwardly to lie closely behind said ring 1. Each of said bars has an angularly disposed inner end portion 4ª which more or less loosely rests against the inner peripheral surface of said ring 1 and to which is attached, as by means of a bolt 5, a substantially L-shaped lug 6 which coacts with said bar for maintaining said ring 1 in place, the outer portion of said lug being disposed to engage the outer face of said ring. The ring 1 is supported in the channels 7 afforded between the ends of the various bars 4ª and the lugs 6 and is more or less free to rotate in said channels.

Mounted upon, or formed integral with, the ring 1 is a plurality of cam members 8 of fin-like form having arcuately curved outer edges with outwardly turned lateral flanges 8ª lying approximately tangential with respect to said ring. Disposed in opposing relation and engaging the internal and external surfaces of the flange 8ª of each cam member 8 are two rollers 9 carried by the inner end portion of a radially disposed spike 10 which is held in place against the outer surfaces of the rings 2 and 3 by means of keepers 11 attached to said rings and through which said spikes are radially movable.

The ring 1 has a portion of its internal periphery provided with gear teeth 12, and disposed in operative relation to said teeth is a worm 13 fixed upon a spindle 14 which has its ends mounted in suitable bearings. As herein shown, said bearings are provided in the inner end portions 15ª of a bifurcated inwardly-extending web 15 carried by, or formed integral with, the ring 3. Said ends 15ª are disposed behind, or inward with respect to, ring 1 and may have laterally extending portions attached to the adjacent bars 4, as by the bolts 5, as indicated in Fig. 1. A ratchet wheel 16 fixed on said spindle 14 has operatively engaged therewith a ratchet pawl 17 carried upon the end of a stem 18 which is loosely held by and is movable through a support 19 carried by a lever 20 which has its inner end pivotally mounted on said spindle. A spring 21 is arranged to yieldingly hold said pawl 17 in engagement with the ratchet wheel 16.

As is obvious from the foregoing, the worm 13 may be rotated forward or back by means of the ratchet mechanism described for producing rotary movement of the ring 1; and, through the cam and roller mechanism described, said spikes 10 will be advanced in an outward direction or retracted, according as said ring is rotated forward or back. It will also be apparent that the extent to which the ends of said spikes project beyond the outer ring 2 is dependent upon the extent of rotation of the ring 1.

The device hereinbefore described may be attached to the wheel of a vehicle in any appropriate or preferred manner. As herein shown for illustrative purposes, the bars 4 are disposed in seating relation both to the outer face of the wheel rim 22 and to the hub-plate 23, and clamps 24 carried by said bars are attached to adjacent spokes 25 of the wheel. Additionally, U-shaped clamps 26, clearly shown in Fig. 7, may have their ends directed through the ring 2 after being passed around the spokes.

The clamp 24 disclosed in Figs. 2 and 8 is designed for engagement with spokes of round form. When flat-sided spokes are used in the wheel, a pair of companion clamps having the form shown in Fig. 9 may be substituted for said clamp 24.

What is claimed is—

1. A traction attachment for vehicle wheels, comprising a circular member adapted to be mounted upon a wheel and rotatable with respect to the latter, a plurality of blades disposed peripherally on said circular member and having curved flanges disposed substantially tangential to the latter and constituting cam surfaces, and a radially disposed spike associated with each of said blades, the inner end portion of said spike being so engaged with the flange of said blade that rotary movement of said circular member actuates the spike to move longitudinally in an outward and inward direction according to the direction of such rotary movement, said circular member having gear teeth, a worm operatively engaged with said teeth, and means for rotating said worm.

2. A traction attachment for vehicle wheels, comprising a circular member adapted to be mounted upon a wheel and rotatable with respect to the latter, a plurality of blades disposed peripherally on said circular member and having curved flanges disposed substantially tangential to the latter and constituting cam surfaces, and a radially disposed spike associated with each of said blades, the inner end portion of said spike being so engaged with the flange of said blade that rotary movement of said circular member actuates the spike to move longitudinally in an outward and inward direction according to the direction of such rotary movement, said circular member having gear teeth, a worm operatively engaged with said teeth, and means for rotating said worm.

3. A traction attachment for wheels, comprising a frame composed of a plurality of ring-like members adapted for mounting upon the outer face of a wheel, a plurality of bars rigidly attached to said members, said bars being prolonged and formed to afford channels at their inner ends, a circular member disposed for rotary movement in said channels, cam members carried by said circular member, a plurality of radially disposed spikes having their inner ends engaged with said cam members and adapted to be actuated longitudinally by rotary movement of said circular member, and means carried by said ring-like members for supporting and guiding said spikes.

In testimony whereof we affix our signatures in presence of a witness.

FRANK A. KIMBLE.
WILLIAM S. FOX.

Witness:
L. S. WARDEN.